UNITED STATES PATENT OFFICE.

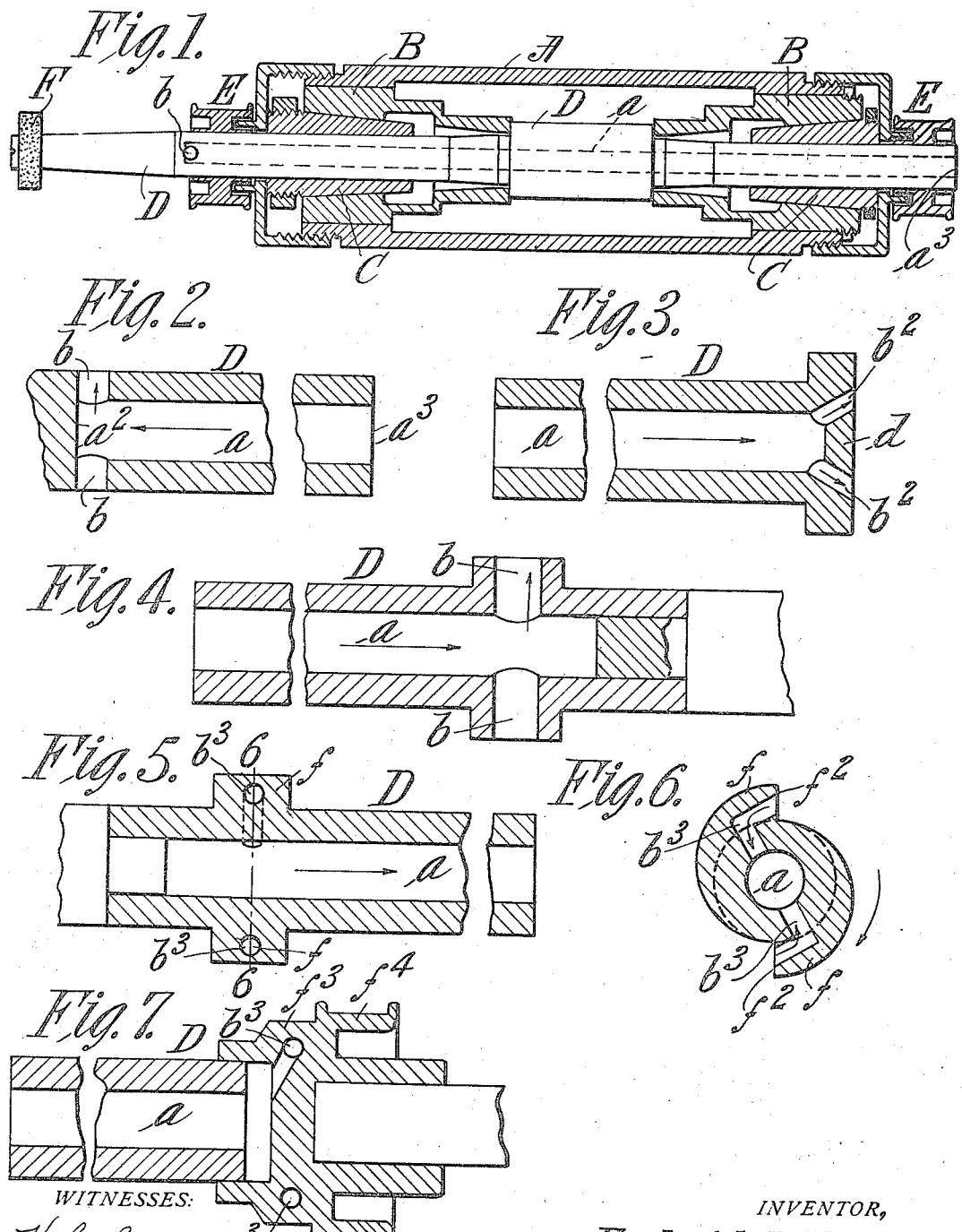

FREDERICK D. VAN NORMAN, OF SPRINGFIELD, MASSACHUSETTS, ASSIGNOR, BY MESNE ASSIGNMENTS, TO VAN NORMAN MACHINE TOOL COMPANY, OF SPRINGFIELD, MASSACHUSETTS, A CORPORATION OF MASSACHUSETTS.

HIGH-SPEED-SPINDLE DEVICE.

1,155,176.      Specification of Letters Patent.    Patented Sept. 28, 1915.

Application filed April 9, 1912. Serial No. 689,527.

*To all whom it may concern:*

Be it known that I, FREDERICK D. VAN NORMAN, a citizen of the United States of America, and resident of Springfield, in the county of Hampden and State of Massachusetts, have invented certain new and useful Improvements in High-Speed-Spindle Devices, of which the following is a full, clear, and exact description.
This invention relates to improvements in high speed spindle devices of the character such, for instance, as described in an application for Letters Patent of the United States filed by me January 27, 1909, Serial No. 474,611.

In devices of the kind to which this invention relates, a spindle may be employed for the carrying of a grinding wheel; and for the efficiency of the grinding or other machine in which the spindle is comprised, the highest attainable speed is desirable. It has, however, been found practically impossible to run the spindle at a speed equal to mechanical possibilities owing to the fact that the spindle becomes heated to such a degree as to cause a deterioration or derangement of the mechanism.

The employment of the best possible kind of bearings and the lubricating means in the high speed spindle device are necessary, and in addition thereto, according to the aim of the present invention, it is highly desirable to provide means for a direct and positive cooling of the spindle.
To this end the invention consists in the high speed spindle device hereinafter described in conjuction with the accompanying drawings and set forth in the claim.

In the drawings:—Figure 1 is a longitudinal sectional view through a bearing head which has mounted therein a spindle construcied in accordance with the invention as the same has been carried out by me. Fig. 2 is a longitudinal sectional view through the spindle, on a larger scale. Figs. 3 to 7 are sectional views showing modification in the construction of the spindle, all of the views being longitudinally taken excepting Fig. 6, which is one on line 6—6, Fig. 5.

In the drawings, A represents a bearing head having bearing supports B B, bearings C C in the bearing supports and the spindle D is extended centrally and longitudinally through the head and has journal bearings and supports in the bearing members C.

The spindle is provided with duplicate pulleys E on portions thereof which are projected outside of and endwise beyond the bearing head, and a grinding wheel F is shown as being carried on the end of the spindle.

The spindle is made hollow by having a bore $a$ therein which in Figs. 1 and 2 is shown as extending from one end of the spindle almost entirely therethrough but having a wall closing its end $a^2$ at a location remote from its open end $a^3$.

One or more holes or passages are drilled through the spindle from its exterior to the bore and angularly to the length of the latter. In Figs. 1 and 2 these passages are produced by radially drilled holes.

When the spindle is rotated with extreme rapidity, say at 20,000 turns per minute, a vacuum will be created at the orifices of the passages $b$ which have their locations outwardly beyond the diameter of the bore, causing a strong draft of air to enter at the end of the spindle and be carried through the bore for exit at the mouths of said passages $b$. This action is found in practice to be very important and useful inasmuch as a running speed of the spindle very much higher than heretofore considered permissible may be effected with an avoidance of heating of the spindle.

In Fig. 3 the passages $b^2$, $b^2$ while angular to the length of the bore and having their orifices at points outside of the diameter of the bore, instead of terminating circumferentially of the spindle, terminate at the end thereof, their positions being through an end wall $d$ in oblique directions.

The construction shown in Fig. 4 does not materially differ from that represented in Figs. 1 and 2 excepting that the radial passages are somewhat longer and terminate farther away from the bore.

In Figs. 5 and 6 the spindle having the bore opening to one end is at a part suitably remote from such end made with suitably shaped enlargements $f$, and passages $b^3$, $b^3$, are formed which extend from the bore to side faces $f^2$, $f^2$ of the enlargements $f$ which are more or less nearly radial to the axis of the bore, so that in the rapid rotation of the spindle the impingement of the side faces $f^2$, $f^2$ against the air will cause a forcing of the latter into the bore at the closed portion and for its exit at its open end, although if the spindle is reversely rotated, the air flow through the spindle will also be reversed.

In Fig. 7 a rotary means for creating a flow of air through the spindle is shown which while associated with the spindle is not necessarily a part thereof. In this view, the portion $f^3$ may be of a construction similar to that shown in Figs. 5 and 6, but comprised in a revoluble member which is separately formed from the spindle and having means, such as the pulley $f^4$ appurtenant to itself for its rotation; while the spindle may have its own means for rotating it which are independent of the pulley $f^4$ formed as one with, or attached to, the part $f^3$.

I claim:—

In a high-velocity spindle device, in combination, a bearing, a spindle rotatable in said bearing, and having a bore longitudinally therein and extending through an open end of the spindle and in direct communication with the atmosphere, a passage leading from the bore angularly to the length of the latter and also in communication with the atmosphere and means for rotating the spindle.

Signed by me at Springfield, Mass., in presence of two subscribing witnesses.

FREDERICK D. VAN NORMAN.

Witnesses:
  G. R. DRISCOLL,
  WM. S. BELLOWS.